Aug. 24, 1965 A. D. BALLATO ETAL 3,202,846

PIEZOELECTRIC CRYSTAL ELEMENT

Filed April 3, 1963

INVENTORS,
ARTHUR D. BALLATO
RUDOLF BECHMANN

BY Harry M. Saragovitz

ATTORNEY.

3,202,846

PIEZOELECTRIC CRYSTAL ELEMENT

Arthur D. Ballato, Long Branch, and Rudolf Bechmann, Shrewsbury, N.J., assignors to the United States of America as represented by the Secretary of the Army Filed Apr. 3, 1963, Ser. No. 270,477
5 Claims. (Cl. 310—9.7)
(Granted under Title 35, U.S. Code (1952), sec. 266)

The invention described herein may be manufactured and used by or for the Government for governmental purposes without the payment of any royalty thereon.

This invention relates to piezoelectric crystal elements, and more particularly to such electroded piezoelectric quartz elements suitable for use as circuit elements in crystal filter systems.

Since crystal filters require at least two resonant frequencies for operation, generally two or more crystal elements are needed. Attempts have been made to utilize a single crystal to obtain the necessary multiple resonances for filter use, but they have proved inadequate for high frequency operation. For example, a prior arrangement utilized inharmonic overtones, which are extremely difficult to reproduce exactly because they depend upon crystal boundary conditions.

An object of this invention is to provide a single piezoelectric crystal element having a plurality of useful modes of motion that may be utilized simultaneously for high frequency operation.

Another object of this invention is to provide a piezoelectric crystal element having a plurality of independently controlled frequencies whose properties can be calculated in advance, and which can be utilized for equally exciting the two thickness shear modes of a piezoelectric quartz element.

Another object of this invention is to reduce the number and cost of crystals used in electric wave filter systems and other wave transmission networks.

In accordance with this invention, a piezoelectric crystal filter or other system may comprise as a component element thereof, a single piezoelectric crystal element adapted to vibrate simultaneously in a plurality of modes of motion in order to provide simultaneously a plurality of useful effective resonances which may be independently controlled, and placed at predetermined frequencies for use in an electric wave filter or elsewhere.

The crystal element may be a quartz crystal plate of suitable orientation and dimensional proportions provided with a suitable electrode arrangement for simultaneously driving two desired modes of motion and controlling the relative strengths of the two resonances independently.

In a particular embodiment, the orientation of the crystal element may be that of a Y cut with an angle having a range of about 22° centered at substantially −23°50′ from the crystallographic Z axis, the axis of rotation being the crystallographic X axis. In a crystal element of this cut, the elastic stiffnesses are such that the frequencies corresponding to the two thickness shear modes are coincident when the angle is at substantially −23°50′ from the Z axis. However, by varying the angle of orientation in the vicinity of this angle of −23°50′, about 11° in either direction, plus or minus, the frequency separation of the modes may be changed, since the frequency is proportional to the square root of the elastic stiffness. Such a crystal element, as described above, when provided with suitable electrodes for parallel field excitation may be utilized to obtain filter circuits using a single crystal, which is electrically equivalent to circuits requiring two crystals.

For a more detailed description of the invention together with other and further objects thereof, reference is had to the following description, taken in connection with the accompanying drawing, in which.

Figure 1:
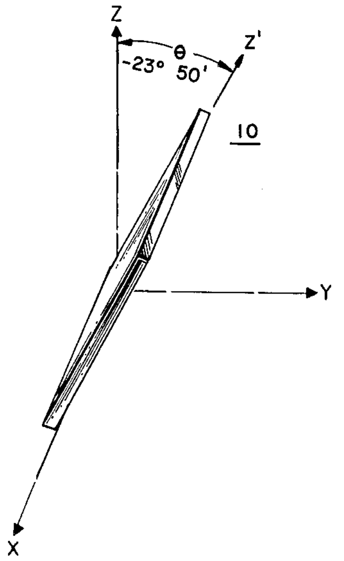
FIG. 1 illustrates the orientation of the quartz crystal plate of this invention with respect to the trigonal crystallographic axis of a mother quartz crystal from which it is cut.

Referring now to FIG. 1, Z is a line representing direction of the vertical, optic or Z axis of a quartz crystal. The line X is representative of the electrical or X axis and is in a plane at right angles to Z. The line Y is representative of the mechanical or Y axis of the quartz crystal and is perpendicular to the X axis in the same plane. The crystal 10 is shown in relation to these axes as it may be cut from a right-handed quartz crystal with relation to the trigonal axis of the crystal.

The natural growth of crystals is sometimes left-handed and sometimes right-handed. This handedness refers to the orientation of certain of the crystallographic planes within the mother crystal and is a factor well known to crystallographers and those engaged in the cutting of quartz crystal oscillator plates.

It may be seen in FIG. 1 that the angle at which crystal 10 is cut is −23°50′ from the Z axis, in the negative direction rotating on the X axis. The negative direction for right-handed quartz is counterclockwise. The negative direction for left-handed quartz is clockwise. Therefore, the crystallographic cut of the crystal 10 is centered at an orientation angle $\theta$ of −23°50′ measured from the Z axis to the Z′ axis. In accordance with IRE standards this cut may be designated as ($yxl$) −23°50′.

Figure 2:
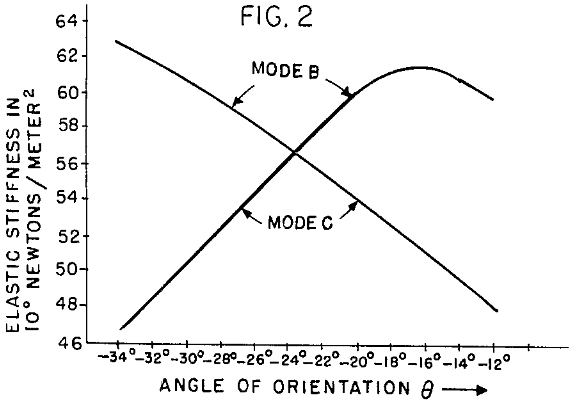
FIG. 2 is a graph illustrating the effective stiffness of the two thickness shear modes, designated B and C, for orientation angles near the point of coincidence.

FIG. 2 is a graph showing the values of elastic stiffness of both thickness shear modes, designated B and C, respectively, plotted against the angle of orientation $\theta$. Since the frequency is proportional to the square root of the elastic stiffness, a graph of frequency versus orientation angle $\theta$ would have substantially the form as the graph illustrated in FIG. 2. The curve designated mode B is that thickness shear mode having the higher elastic stiffness, and the curve designated mode C the lower elastic stiffness. As indicated in the graph, the elastic stiffness for both shear modes B and C are of equal value when the angle of orientation $\theta$ is substantially equal to −23°50′. Thus, any departure in either direction, plus or minus, of the angle of orientation $\theta$ from the point of coindence, of the two thickness shear modes B and C, results in a quartz crystal element having two separate and distinct shear mode frequencies. The operating range of the angle of orientation $\theta$ for crystal element 10 is about 22° centered at −23°50′, with the lower limit for angle $\theta$ being at substantially −12° and the upper limit being at substantially −34°. In accordance with IRE standards, this range may be designated as ($yxl$) $\theta$, with $\theta$ having a range from substantially −12° to −34°.

Figure 3:
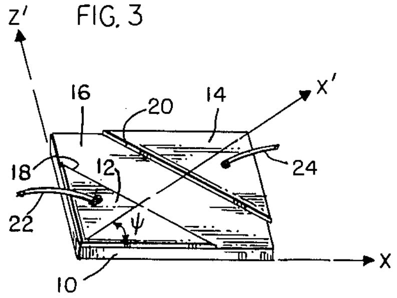
FIG. 3 is a major face view of the electroded crystal element of FIG. 1.

FIG. 3 illustrates a form of electrode arrangement using parallel field excitation which may be utilized to drive the crystal element 10 of FIG. 1 simultaneously in two thickness shear modes, and thus obtain simultaneously therefrom two independent resonance frequencies of values corresponding to the curves B and C of FIG. 2.

In FIG. 3 is shown a major surface view of crystal element 10 having electrodes 12 and 14 extending over a major surface thereof, except for an uncovered gap 16 extending across the center of the major surface. Electrodes 12 and 14 may comprise a pair of film-like metallic coatings which may be applied in a conventional manner, such as by thermal evaporation or chemical deposition. The proximal edges 18 and 20 of the respective electrodes 12 and 14 which form the gap 16 are of linear contour and are parallel to each other. The gap 16 is so oriented that its prescribed center line lies substantially perpendicular to the X′ axis. The X′ axis is used with the X axis of element 10 to form the azimuth angle $\psi$, as is shown in the figure. The width of gap 16 between electrodes 12 and 14 may vary, but the prescribed center line is always parallel to edges 18 and 20. The electrodes 12 and 14 are respectively connected to leads 22 and 24, by which element 10 can be connected into an electronic circuit to apply an electric field parallel to the major surfaces of element 10.

When the proximal edges 18 and 20 of electrodes 12 and 14, respectively, are substantially parallel to the X axis of element 10, element 10 will be excited by a parallel field in only one of the two thickness shear modes (see R. Bechmann, "Excitation of Piezoelectric Plate by Use of a Parallel Field With Particular Reference to Thickness Modes of Quartz," Proc. IRE, vol. 48, No. 7, July 1960, pp. 1278–1280). When edges 18 and 20 are substantially perpendicular to the X axis of element 10, the other thickness shear mode will be solely excited. However, when the azimuth angle $\psi$, measured from the X axis of element 10 to the X′ axis, is between 0° and 90°, both thickness shear modes are simultaneously excited. Thus by varying the azimuth angle $\psi$ which the electric field makes with the X axis of element 10, the relative strength of the excitation of each thickness shear mode can be governed. It has been found that for each and every cut of element 10 near the point of coincidence of the two thickness shear modes, there exists an azimuth angle $\psi$ such that both modes are excited equally.

Figure 4:
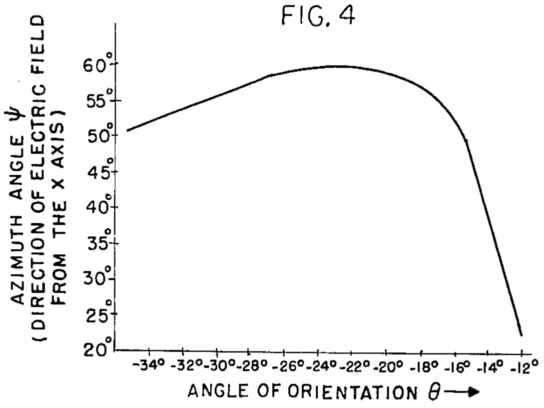
FIG. 4 is a graph of the azimuth angle $\psi$ versus the orientation angle $\theta$.

FIG. 4 is a graph showing the locus of the direction of the electric field as measured by the azimuth angle $\psi$ versus the orientation angle $\theta$, and which results in equal excitation for both thickness shear modes. It can be seen in FIG. 4, that for a range of angle of orientation $\theta$ between −12° and −34°, the azimuth angle $\psi$ ranges, respectively, between 20° and 60°. For example, At $\theta=-12°$, $\psi=20°$;
AT $\theta=-18°$, $\psi=58°$;
At $\theta=-26°$, $\psi=58.5°$; and
At $\theta=-34°$, $\psi=51°$.

While there has been described what is at present considered a preferred embodiment of the invention, it will be obvious to those skilled in the art that various changes and modifications may be made therein without departing from the invention, and it is therefore aimed in the appended claims to cover all such changes and modifications as fall within the spirit and scope of the invention.

What is claimed is:

1. A piezoelectric quartz crystal element for exciting the two thickness shear modes, said element being cut from the mother quartz at an angle centered at substantially −23°50′ from the Z axis, the axis of rotation being the X axis and having a range −12° to −34°.

2. A piezoelectric quartz crystal element for exciting the two thickness shear modes, said element being cut from the mother quartz at an angle centered at substantially −23°50′ from the Z axis, the axis of rotation being the X axis and having a range of −12° to −34°, and a pair or discrete electrodes utilized for parallel field excitation mounted on a major surface of said element.

3. A rectangular piezoelectric quartz crystal element for exciting the two thickness shear modes equally, said element being cut from the mother quartz at an angle ranging between −12° and −34° centered at substantially −23°50′ from the Z axis, the axis of rotation being the X axis, a pair of discrete electrodes mounted on a major surface of said element, said electrodes utilized for parallel field excitation, the parallel proximal edges of said electrodes being spaced from each other to form a gap therebetween, said edges being substantially perpendicular to the X′ axis which makes an angle $\psi$ with the X axis of said element, and said angle $\psi$ ranging between 20° and 60°.

4. A rectangular piezoelectric quartz crystal element for exciting the two thickness shear modes equally, said element being cut from the mother quartz at an angle of substantially −18° from the Z axis, the axis of rotation being the X axis, a pair of discrete electrodes mounted on a major surface of said element, said electrodes utilized for parallel field excitation, the parallel proximal edges of said electrodes being spaced from each other to form a gap therebetween, said edges being substantially perpendicular to the X′ axis which makes an angle $\psi$ with the X axis of said element, and said angle $\psi$ being substantially 58°.

5. A rectangular piezoelectric quartz crystal element for exciting the two thickness shear modes equally, said element being cut from the mother quartz at an angle of substantially −34° from the Z axis, the axis of rotation being the X axis, a pair of discrete electrodes mounted on a major surface of said element, said electrodes utilized for parallel field excitation, the parallel proximal edges of said electrodes being spaced from each other to form a gap therebetween, said edges being substantially perpendicular to the X′ axis which makes an angle $\psi$ with the X axis of said element, and said angle $\psi$ being substantially 51°.

References Cited by the Examiner

UNITED STATES PATENTS

| | | | |
|---|---|---|---|
| 2,886,787 | 5/59 | Broadhead et al. | 310—9.8 |
| 3,072,806 | 1/63 | Sogn | 310—9.5 |

OTHER REFERENCES

Handbook of Piezoelectric Crystals for Radio Equipment Designers, John P. Buchanan, Philco Corporation, December 1954, pages 34 and 35; Cataloged by ASTIA as AD No. 5555.

ORIS L. RADER, *Primary Examiner.*

MILTON O. HIRSHFIELD, *Examiner.*